(12) United States Patent
Yanover et al.

(10) Patent No.: US 7,925,295 B2
(45) Date of Patent: Apr. 12, 2011

(54) HANDLING COMMUNICATION INTERFERENCE IN WIRELESS SYSTEMS

(75) Inventors: Vladimir Yanover, Herzlia (IL); Tal Kaitz, Kiryat Ono (IL); Naftali Chayat, Kfar Saba (IL)

(73) Assignee: Alvarion Ltd., Tel-Aviv (IL)

( * ) Notice: Subject to any disclaimer, the term of this patent is extended or adjusted under 35 U.S.C. 154(b) by 856 days.

(21) Appl. No.: 11/578,598

(22) PCT Filed: Apr. 13, 2005

(86) PCT No.: PCT/IL2005/000391
§ 371 (c)(1),
(2), (4) Date: Aug. 6, 2007

(87) PCT Pub. No.: WO2005/101888
PCT Pub. Date: Oct. 27, 2005

(65) Prior Publication Data
US 2007/0280096 A1    Dec. 6, 2007

(30) Foreign Application Priority Data

Apr. 15, 2004   (IL) .......................................... 161419

(51) Int. Cl.
*H04M 1/00* (2006.01)
(52) U.S. Cl. ...................... 455/552.1; 455/63.1; 455/524
(58) Field of Classification Search ................. 455/63.1, 455/63.2, 524, 103, 422.1, 517, 552.1, 561, 455/114.2, 278.1, 296, 403, 426.1, 435.2, 455/67.11
See application file for complete search history.

(56) References Cited

U.S. PATENT DOCUMENTS

| | | | |
|---|---|---|---|
| 5,164,958 A * | 11/1992 | Omura ........................... | 375/140 |
| 5,430,889 A * | 7/1995 | Hulbert et al. ............. | 455/422.1 |
| 5,710,797 A | 1/1998 | Segal | |
| 6,108,517 A | 8/2000 | Arslan et al. | |
| 6,295,290 B1 | 9/2001 | Soderkvist et al. | |
| 6,442,387 B1 | 8/2002 | Silventoinen et al. | |
| 6,993,361 B2 * | 1/2006 | Chitrapu .................... | 455/562.1 |
| 7,103,376 B2 * | 9/2006 | Takano et al. ................. | 455/522 |
| 7,551,663 B1 * | 6/2009 | Proctor, Jr. ..................... | 375/147 |
| 2002/0085519 A1 * | 7/2002 | Virtanen ....................... | 370/335 |
| 2002/0136169 A1 | 9/2002 | Struhsaker et al. | |
| 2002/0137464 A1 * | 9/2002 | Dolgonos et al. .............. | 455/60 |
| 2003/0128658 A1 * | 7/2003 | Walton et al. ................. | 370/208 |
| 2003/0169693 A1 * | 9/2003 | Geck et al. .................... | 370/250 |
| 2003/0179731 A1 * | 9/2003 | Noguchi et al. .............. | 370/331 |
| 2004/0085239 A1 * | 5/2004 | Ukena et al. .................... | 342/81 |
| 2004/0153767 A1 * | 8/2004 | Dolgonos ....................... | 714/18 |
| 2005/0047325 A1 * | 3/2005 | Singh et al. .................. | 370/210 |

(Continued)

FOREIGN PATENT DOCUMENTS

EP    0 590 252 A1    4/1994

(Continued)

*Primary Examiner* — Dominic E Rego
(74) *Attorney, Agent, or Firm* — Browdy and Neimark, PLLC

(57) ABSTRACT

A method and devices are provided to allow reducing interferences occurring in adjacent wireless communication networks. When a subscriber device experiences interferences resulting from the operation of an adjacent wireless network, it transmits an adjustment signal which serves as a request for adjustment, to the base station operative at the adjacent wireless communication network. The adjacent base station that receives the adjustment signal retrieves adjustment information therefrom, and based on the retrieved information will determine whether it should effect a change in its transmission that would result in reducing the interferences experienced at the subscriber device sending the adjustment signal.

34 Claims, 1 Drawing Sheet

U.S. PATENT DOCUMENTS

| | | |
|---|---|---|
| 2005/0202824 A1 | 9/2005 | Goldhammer |
| 2005/0245264 A1* | 11/2005 | Laroia et al. .................. 455/445 |

FOREIGN PATENT DOCUMENTS

| | | |
|---|---|---|
| EP | 1 442 839 A1 | 8/2004 |
| GB | 2 304 495 A | 3/1997 |
| WO | WO 96/02987 A1 | 2/1996 |
| WO | WO 98/37646 A1 | 8/1998 |
| WO | WO 98/38821 A1 | 9/1998 |
| WO | WO 02/103921 A1 | 12/2002 |
| WO | WO 03/021819 A1 | 3/2003 |

* cited by examiner

HANDLING COMMUNICATION INTERFERENCE IN WIRELESS SYSTEMS

FIELD OF THE INVENTION

The present invention relates to digital communications and, in particular, to handling interferences while transmitting and receiving signals in wireless communications systems.

BACKGROUND OF THE INVENTION

As known in the art, a primary consideration in any digital communications system is the channel bandwidth and channel separation required to transmit information. Therefore, digital systems are typically designed to utilize channel bandwidth as efficiently as possible. For example, in systems utilizing frequency division multiplexing, maximum spectral efficiency is obtained by spacing frequency channels very close to one another in an available spectrum.

Minimum carrier spacing is limited in practice, however, by adjacent channel interference. Adjacent channel interference is defined as the interference resulting when carrier frequencies are spaced close enough to one another that information signals received from number of carriers overlap in the frequency spectrum, or in other words, the interferences created when a number of close by systems (base stations) use the same or adjacent frequency channels. In practice, the minimum allowable carrier spacing is a function of the bandwidths of the information signals, the practical limitations associated with receiver filtering, and the signal modulation and coding schemes used. Number of design improvement providing increased suppression of adjacent channel interference have been suggested to increase system capacity, relax coding and modulation design requirements, or improve signal quality.

In conventional systems, adjacent channel interference is suppressed in a number of ways. For example, demodulation parameters such as linear or decision feedback equalization filter coefficients are adapted to minimize noise and adjacent channel interference together. Alternatively, spectrally efficient continuous phase modulation (CPM) techniques can be used to reduce the effects of adjacent channel interference.

U.S. Pat. No. 6,108,517 discloses methods and apparatus for receiving adjacent channel signals wherein adjacent channel interference effects are minimized through joint demodulation of the adjacent channel signals. A channel associated with each signal and each corresponding frequency band is estimated and used to form joint branch metrics for joint sequence estimation. Thus, a baseband processor receives baseband samples corresponding to a certain carrier frequency, and then jointly demodulates at least two information streams corresponding to different carrier frequencies in dependence upon the received baseband samples.

US application 20020136169 discloses a wireless access system for allocating and synchronizing uplink and downlink of TDD frames. By this publication, a TDD frame transmission synchronization apparatus is used in a fixed wireless access network comprising a plurality of base stations capable of bi-directional time division duplex (TDD) communication with a plurality of wireless access subscriber devices. The TDD frame transmission synchronization apparatus comprises a frame allocation controller for receiving from a first radio frequency (RF) modem shelf associated with a first base station access requests generated by a first group of wireless access devices communicating with the first base station and determining from traffic requirements associated with the access requests a time duration of a longest downlink portion of TDD frames used by a first one of a plurality of RF modems in the RF modem shelf to communicate with a first wireless access subscriber device. The frame allocation controller further determines a frame allocation of the downlink portion and the upLink portion of TDD frames used by the plurality of RF modems to communicate with the first group of wireless access subscriber devices.

WO 02103921 describes a method for reducing interferences in a Time Division Duplexing (TDD) system. By this method the amount of interference to communications in TDD mode between a TDD mobile and a TDD base station from a mobile operating in Frequency Division Duplexing (FDD) mode located near the TDD base station can be reduced by passing information regarding the interfering FDD signal to the TDD base station, where it is processed and subtracted from the received TDD signal, which includes the interference, so as to obtain the pure TDD signal. Either the FDD data or an FDD signal regenerated from the FDD data or simply the received FDD signal can be passed to the TDD base station. The TDD base station can regenerate an FDD signal, if required, which is then filtered using TDD filters and normalized by correlating and scaling the filtered FDD signal to a received TDD signal. The normalized FDD signal is then subtracted from the received TDD signal to reduce the interference.

U.S. Pat. No. 5,710,797 describes a single transducer digital communication receiver which is capable of extracting the data bits of at least one desired signal in the presence of interfering signals of similar type, so as to provide a system in which overlapping transmissions are tolerated and allowed. This publication describes a specific frequency plan, which includes an appropriate digital demodulator that extracts the data bits of the desired signal(s) in the presence of closely spaced signals. The disclosure enables reduced channel spacing in digital communication systems and thereby increases the system capacity (i.e. the number of users per bandwidth unit) without incurring any significant loss in system performance (e.g. power margins, BER, and channel availability). It also allows a reduced power margin that is required to maintain a pre-specified performance level without sacrificing system capacity.

WO 9837646 describes a method of estimating interference level in a cellular radio system that comprises in each cell a base station and a number of subscriber terminals. The terminals measure power levels at those frequencies which are on the list that is maintained by the terminal and to which the terminal can perform a handover.

EP 719480 discloses a method for simulating interferences received by subscribers in a spread spectrum communications system, by which users from a plurality of cells communicate information signals between one another through at least one base station and using and code division multiple access (CDMA) spread spectrum type communication signals. The disclosed method includes determining a first composite signal energy associated with signal transmission from the base station transmitter over a first set of simulated channels. The simulation method further contemplates estimating a first average data rate for the first composite signal energy. Signal power transmitted over the one channel is adjusted in accordance with a first interference signal which is based on the first composite signal energy and first average data rate.

U.S. Pat. No. 6,442,387 teaches a method for estimating the interference level in a cellular radio system comprising in each cell a base station in each cell, and a number of subscriber terminals communicating with the base station. The terminals measure power levels from those frequencies which are on the list that is maintained by the terminal and comprised those base stations and frequencies to which the terminal can perform a handover. In the solution of the invention the list also comprises frequencies whose power level information is used for the frequency planning of the system. Frequency planning can thus be implemented without any separate means.

In our copending application, IL 160832, there is described a method used in a wireless network comprising at least one base station and a plurality of subscriber terminals, for allocating time slots for operating at frequencies that are affected by interferences caused by another base station or terminal(s) belonging to a different network, where the method comprises dividing a time slot allocated for transmission along an interfered channel that experiences interferences into time sub-frames, where at least one of the time sub-frames is reserved for transmitting radio signals from the base station to a terminal belonging to that network and experiencing interferences while at least another time sub-frame is reserved for transmitting radio signals in another network from another base station to a subscriber terminal associated therewith.

The disclosure of the references mentioned herein throughout the present specification are hereby incorporated by reference.

As noted above, however, minimizing or avoiding adjacent channel interference using the above described systems do not provide an adequate solutions for broad applications. In particularly, when there is a cell using IEEE 802.16 technology based on orthogonal Frequency Division Multiplexing (OFDM) modulation with capability of beam-forming while using Advanced Antenna System (AAS) at the Base Station (BS). Downlink (DL) transmissions of the cell may cause interference to DL transmissions at adjacent cells using the same technology and operating at same or even adjacent frequency channel.

Thus, there is a need for improved methods and apparatus for significantly reducing the impact of interferences in cases as described above.

SUMMARY OF THE INVENTION

It is an object of the present invention to provide a method and apparatus to minimize interferences created when a number of systems are using the same or adjacent frequency channels.

Other objects of the invention will become apparent as the description of the invention proceeds.

The solution provided by the present invention relies on adjustment(s) to be made in order to decrease interference problems experienced at a first wireless network, which adjustment(s) is/are made at a second base station associated with a second wireless network, based on adjustment information derived thereat from subscriber devices which are normally in bi-directional communication with a first base station associated with that first wireless network.

By one embodiment of the present invention, the adjustment information is derived from a signal transmitted at a frequency used by the subscriber device to transmit the information to the first base station, but which carries no data. Such signal is preferably pre-defined for the first base station. It may be implemented similarly to preamble transmissions. In other words, the second base station will receive the signal and derive therefrom one or more parameters that may be used to decrease the level of interference to and/or by that subscriber device. Optionally or in the alternative, the second base station uses a signal received from the subscriber device which is originally transmitted to the first base station and derives therefrom the adjustment information required. By yet another option, a combination of the preceding two alternatives (i.e. using a both types of adjustment information signals) may be used to allow the second base station to retrieve the required adjustment information.

Preferably, the adjustment information comprises one or more of the following:

Timing of DL transmission in neighboring cells;

Estimation of path loss between the BS and subscriber devices to which the transmissions are addressed;

Location of the subscriber devices;

Estimation of the response of the channel between the subscriber device and the base station, where the response may include phase and/or amplitude information. Preferably, if either the base station and/or the subscriber device is equipped with more than one antenna, the response from each of the antennas would be estimated; and Transmission power.

According to another embodiment of the invention, a decision is taken at the first BS whether an action should be taken to decrease interference to subscriber devices of neighbor cells by adjusting transmission power and/or AAS beamforming or not, where such a decision is based on the adjustment information. As will be appreciated by those skilled in the art, there could be cases where in spite of the possibility to decrease such interferences, no action will be taken by the first base station, particularly when such an action would means a deterioration in the bi-directional communication carried between that first base station and the subscriber device(s) belonging to the system associated therewith.

Thus in accordance with an embodiment of the present invention, there is provided in a first wireless network comprising at least one first base station and at least one first subscriber device, wherein interferences are experienced in communications held between the at least one first subscriber device and the at least one first base station where the interferences result from the operation of a second wireless network comprising at least one second base station and at least one second subscriber device, a method for reducing the interferences which comprises:

transmitting from the at least first subscriber device an adjustment signal which comprises adjustment information as explained above;

receiving the adjustment signal at the second base station and retrieving adjustment information therefrom;

based on the adjustment information thus retrieved, making at the second base station a decision whether a change in its transmission should be effected in order to reduce interferences caused by the operation of the second base station and experienced during communications held between the first subscriber device and the first base station.

According to another embodiment of the invention, the method further comprising a step of carrying out an adjustment in transmissions from the second base station.

Preferably, the step of carrying out an adjustment comprises effecting a change in the timing of transmissions being at a frequency which is substantially the same frequency as that in which the at least first subscriber device is operative, or effecting a change in the antenna beam directing, or effecting a change in the power of at least the transmissions being at a frequency which is substantially the same frequency as that in which the at least first subscriber device is operative, or any combination thereof.

By still another embodiment of the invention, in response to the information retrieved from the adjustment signal, that at least one second base station transmits to the at least one second subscriber device a signal indicating a change to be effected in transmissions from the at least one second subscriber device to the at least one second base station in order to reduce interferences affecting communication between the at least one first base station and the at least one first subscriber device.

Preferably, base stations frames are synchronized at all the base stations. In TDD case DL/UL sub-frames must be synchronized as well. Such synchronization is typically achieved by synchronization to GPS, but could also be carried by incorporating in-band marking signals indicating a sub-frame beginning, a sub-frame end or both.

By an embodiment of the invention, the first BS transmits message(s) to the subscribers that allocate resources of the channel (time/frequency/subcarriers/code). Preferably, one of such UL allocations is dedicated to adjustment signals (of all subscribers). A subscriber may choose time slot/subcarriers within the allocation to transmit its own adjustment signal. The choice is preferably dictated by time interval allocated for DL transmission to this subscriber.

In accordance with still another embodiment of the invention, the step of making a decision whether a change in its transmission should be effected is also based on a load of traffic to be transmitted by the at least one second base station to said at least one second subscriber device.

According to another aspect of the invention there is provided a base station adapted to operate in a wireless network and comprising:

a backhaul interface operative to allow communication between said base station and a communication network associated therewith;

at least one radio transceiver operative at least one frequency and capable of transmitting communication traffic towards at least one subscriber device and receive communication traffic therefrom, and further operative to receive an adjustment signal transmitted from at least one further subscriber device associated with a different base station;

at least one processor adapted to:
retrieve adjustment information from said adjustment signal received;
make a decision whether to effect a change in transmissions from said base station or from any of said at least one subscriber device in order to reduce interference occurring in communications with said at least one further subscriber device, and if in the affirmative, what change should be effected.

By yet another preferred embodiment the base station further comprises an advanced antenna system adapted to effect a change in the antenna beam-directing, in response to a suitable decision made by the at least one processor.

According to another embodiment of the invention the base station may further comprises a power controller adapted to effect a change in the power of at least the transmissions being at a frequency which is substantially the same frequency as that in which the at least one subscriber device is operative, in response to a suitable decision made by the at least one processor.

By yet another embodiment, the base station is further adapted to transmit an indication signal in response to the information retrieved from the adjustment signal, to the at least one subscriber device, wherein the indication signal indicates a change to be effected in transmissions from the at least one subscriber device in order to reduce interferences affecting communication between the at least one further subscriber device and a base station associated therewith.

According to yet another aspect of the invention there is provided a subscriber device adapted to operate in a wireless network and comprising:

an interface operative to allow communication between the subscriber device and at least one base station;

at least one radio transceiver operative at least one frequency and adapted to transmit communication traffic towards the at least one base station and receive communication traffic therefrom;

at least one processor adapted to:
establish which of the channels carrying traffic to or from said subscriber terminal experience such interferences;
wherein the at least one radio transceiver is adapted to transmit a radio adjustment signal to be received by at least one further base station which signal characterizes the communication to and/or from said subscriber device that is subjected to interferences by communications carried between said at least one further base station and at least one further subscriber device associated therewith.

According to another embodiment of this aspect of the invention, the at least one processor is further adapted to determine the existence of interferences caused by radio transmissions at a substantially the same or substantially adjacent frequency occurring during transmission to or reception from said at least one base station.

According to yet another embodiment of the invention, the step of transmitting the adjustment signal comprises transmitting an adjustment signal selected from a set of orthogonal or substantially orthogonal waveforms, where the orthogonality is in the time domain, and/or in the frequency domain, and/or in the code domain.

By yet another embodiment of the invention, the step of receiving the adjustment signal at the second base station and retrieving adjustment information therefrom, comprises taking into account differences existing in propagation times between the first subscriber device and the first and second base stations, respectively. According to another embodiment of the invention, the method provided further comprises the step of distinguishing between adjustment signals received from different subscriber devices. Preferably, this step comprises a step of using non-overlapping or partially overlapping sub-sets of waveforms, wherein said sub-sets are distinct in the time domain and/or in the frequency domain or in the code domain. More preferably, the step of using non-overlapping or partially overlapping sub-sets of waveforms comprises assigning specific sub-sets by a network management entity, or by associating a sub-set with a unique base station identifier code.

In accordance with still another embodiment, the method provided further comprises the step of dividing DL sub-frames transmitted by the two base stations into essentially synchronized slots, where each DL transmission (i.e. burst of data transmission) starts at a corresponding slot boundary, and where there is a one-to-one correspondence between these slots and slots allocated for the transmission of the adjustment signals.

Preferably, the division of the DL sub-frame into slots is performed in the time domain, and/or frequency domain and or code domain and/or in any other multiplexing scheme employed by the system. The divided slots may be of unequal size.

According to still another embodiment of the invention, the adjustment signal occupies sets of contiguous or non-contiguous subcarriers over one or more OFDM symbols. Preferably, the subcarriers are modulated by orthogonal or nearly orthogonal sets of amplitude and/or phase sequences, and wherein said modulation is carried out in the frequency domain, and/or in the time domain.

In accordance with another embodiment, the adjustment signals are adapted for use for OFDM schemes, by cyclically extending the transmitted waveforms so that propagation differences between base stations are accounted for. The cyclic extension may be much higher than the cyclic extension used for the data carrying section of the OFDM transmissions. Preferably, the cyclic extension is set equal to one or several OFDM symbol durations.

By yet another embodiment of the present invention, the method provides the allocation of non-overlapping or partially overlapping sub-sets of waveforms. The subsets are distinct in the time domain and/or in the frequency domain or in the code domain. Preferably, the allocated subsets of adjustment signals to BS comprises assigning specific subsets (e.g. by a network management entity), or by associating a subset with unique BS identifier code.

By yet another preferred embodiment of the invention, the partitioning the DL sub-frame into transmission slots is optimized according to the type of traffic and the payload distribution. The optimization is achieved by controlling the size of the transmission slots. Adaptation to time variations is preferably done by using a network management entity, and the optimized partitioning is distributed across the network.

According to still another embodiment of the invention, the method provided further comprises a step of selecting the subscriber device that is provided with a TO for transmitting the adjustment signals. Preferably, only the subscriber device that transmits the adjustment signal will benefit the interference reduction from the other BS. The selection of which of the subscriber devices will transmit the adjustment signals is made in accordance with one or more of the following methods:

a. at the base station, assigning a transmission opportunity for transmitting said adjustment signal, to those subscribers with low CINR, or to those subscribers to which previous DL transmissions had failed; or b. at the base station, assigning a transmission opportunity for transmitting said adjustment signal, to those subscribers to which a transmission opportunity were not assigned in the previous frames; or c. at the base station, assigning a transmission opportunity for transmitting said adjustment signal, to those subscriber devices which carry high volumes of traffic or traffic with high quality Of service requirements; or d. at the base station, assigning transmission opportunities to all subscriber devices provided with DL allocations.

According to still another embodiment of the invention, a base station may determine whether to allocate the appropriate slot in the DL allocation assigned to each of the subscribers or not.

According to another embodiment of the invention, a decision may be taken by the processor of the subscriber device whether to transmit an adjustment signal in the allocated slot, or not. Such a decision may be taken according, for example, to the interference estimation.

DETAILED DESCRIPTION OF THE INVENTION

Figure 1:
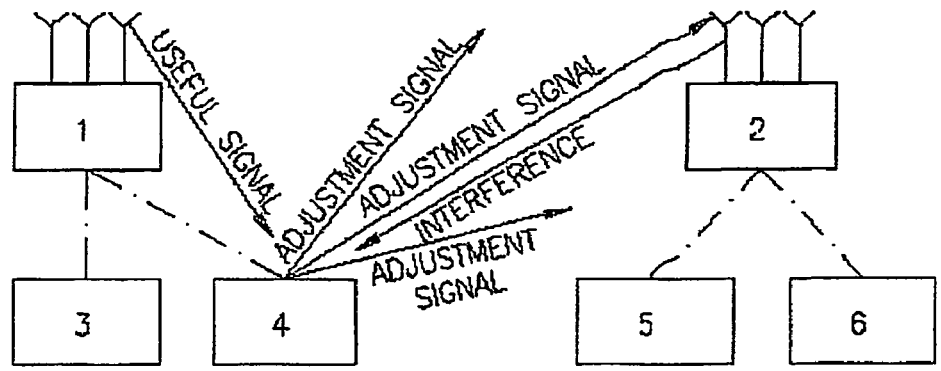
FIG. 1 illustrates a two radio networks setup, overlaid and not co-located wherein interference problems are solved in accordance with the present invention.

A better understanding of the present invention is obtained when the following non-limiting detailed description is considered in conjunction with the following drawings in which:

FIG. 1 illustrates two base stations 1 and 2, subscriber devices 3 and 4, which belong to the network serviced by base station 1 are located close to base station 2, and therefore might be affected by the transmission to and from that base station, when the transmissions are at frequencies adjacent to those used by terminals 3 and 4, respectively. Base station 1 (and preferably BS 2 as well) further comprises a processor (not shown in this Fig.) operative to evaluate the adjustment information received from subscriber devices of the other network which may result from any one of a number of reasons, such as the other subscriber device wherein a channel at an adjacent frequency is used, is too close to the base station, the other subscriber device uses the same channel frequency as that used in the current cell, etc. Similarly, the subscriber devices 3 and 4 may comprise an interface (not shown in this Fig., to allow their connection to the user equipment and/or to the terminal equipment, a radio transceiver which is operative to transmit and receive radio transmissions to and from base station, and a processor that may be operative also in measuring and evaluating the interferences in the radio transmissions received.

As explained above, there could be a number of reasons why such interferences occur. Some examples of layouts which may lead to the creation of such interferences are illustrated in FIGS. 2A and 2B.

Figure 2:
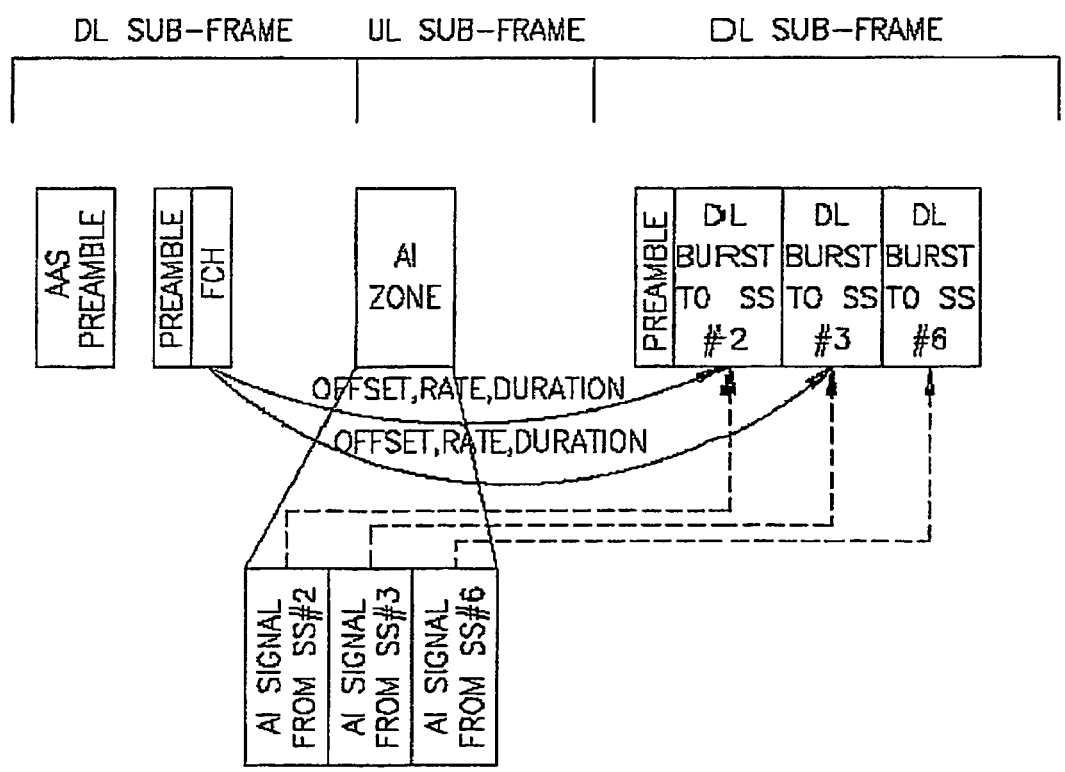
FIG. 2 presents a schematic frame which comprises AI Zone, TOs and DL allocations.

Let us now consider for example a case where all the cells concerned operate at TDD with synchronized DL and uplink (UL) sub-frames. FIG. 2 exemplified a schematic illustration of Downlink Frame Prefix (DLFP), i.e. payload of FCH burst, comprising DL Information Elements (DL IEs) which specify location, modulation etc. of DL bursts. Alternatively this information may be transmitted in DL-MAP message.

The following is the illustration of the method carried in accordance with the present invention:

1. The DL is divided into a number of DL transmission slots (bursts) allocated for certain subscriber devices (SSs). Base station signals in DLFP or DL-MAP messages are used, among others, to inform of the allocation of DL bursts. Such allocations are made in a unicast form so immediately after reception of DLFP or DL-MAP, each SS becomes aware of DL allocations directed thereto;

2. BS allocates Allocation Indication Zone (AI Zone) starting at the beginning of UL sub-frame. This zone is intended for adjustment signals (AI signals) transmitted by the subscriber devices.

3. AI Zone is divided into transmission opportunities (TOs). Each TO specifies a unique allocation in the time, frequency or code space, in such a way that there is a unique correspondence between each TO and a DL allocation. As a specific example, in OFDM systems, the allocation may consist of contiguous set of sub-carriers over several OFDM symbol intervals.

4. The number of TOs in the AI zone is fixed and is set to be sufficient for maximum expected number of subsequent DL allocations.

5. When a subscriber device receives a DL allocation, it may transmit in the correspondent TO a pre-defined waveforms.

6. BS listens at AI TOs and thus collects information on future DL transmissions of subscriber devices in neighbor cells, including their location, distance, path loss, transmit power, channel response, etc. Additionally, information duration of frame and DL/UL portions of the frame at neighbor base stations may be acquired. This information, referred to herein as adjustment information may be used later in DL beamforming to decrease interference in communications involving the corresponding subscriber devices.

7. Some or all TOs might be allocated to signals from neighbor subscriber devices that request interference reduction for long time rather than for specific time interval AI signals of subscriber devices that are registered at certain BS, may also be used for periodic ranging and tracking of mobile terminals.

As will be appreciated by those skilled in the art, a successful implementation of the present invention will preferably include a highly accurate distributed timing architecture so that the timing of the downlink and uplink portions of each TDD frame is precisely aligned in order to effect the changes decided upon. For example, the length of the longest downlink transmission may be determined to ensure that none of the uplink transmissions begin, and none of the base station receivers begin to receive, until after the longest downlink is completed. The present invention may also determine the length of the longest downlink transmission among two or more cell sites to ensure that none of the base station receivers in any of the cells begins to receive in the uplink until after the longest downlink transmission is completed.

Thus, the present invention further provides a TDD frame transmission synchronization apparatus for use in a fixed wireless access network comprising a plurality of base stations capable of bidirectional time division duplex (TDD) communication with wireless access devices disposed at a plurality of subscriber premises.

According to another embodiment of the present invention, the TDD frame transmission synchronization apparatus further comprises a clock signal distribution circuit capable of synchronizing the starting points of the downlink portions of TDD frames transmitted by the plurality of RF modems.

The foregoing has outlined rather broadly the features and technical advantages of the present invention so that those skilled in the art may better understand the detailed description of the invention that follows. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

It is to be understood that the above description only includes some embodiments of the invention and serves for its illustration. Numerous other ways of managing various types of compressed signals in telecommunication networks may be devised by a person skilled in the art without departing from the scope of the invention, and are thus encompassed by the present invention.

The invention claimed is:

1. In a first wireless network comprising at least one first base station and at least one first subscriber device, wherein interferences are experienced in communications conducted between said at least one first subscriber device and said at least one first base station and wherein said interferences result from the operation of a second wireless network comprising at least one second base station and at least one second subscriber device, a method for reducing said interferences which comprises:

transmitting from said at least first subscriber device an adjustment signal;
receiving said adjustment signal at said second base station and retrieving therefrom adjustment information;
based on the adjustment information thus retrieved, determining at said second base station whether a change in its transmissions should be effected, wherein carrying out said change would result in reducing the interferences experienced at said at least first subscriber device.

2. A method according to claim 1, wherein said adjustment information comprises information which relate to the timing of expected transmissions from said first base station to said first subscriber device.

3. A method according to claim 1, further comprising a step of carrying out an adjustment in transmissions from said second base station, based on said information retrieved.

4. A method according to claim 1, wherein said step of making a decision whether a change in its transmission should be effected, is also based upon a load of traffic to be transmitted by said at least one second base station to at least one second subscriber device associated therewith.

5. A method according to claim 1, wherein in said step of transmitting said adjustment signal comprises transmitting an adjustment signal selected from a set of orthogonal or substantially orthogonal waveforms, where said orthogonality is in the time domain, or in the frequency domain, or in the code domain, or in any combination of any of these domains.

6. A method according to claim 1, further comprising the step of distinguishing between adjustment signals received from different subscriber devices.

7. A method according to claim 6, wherein said step of distinguishing between adjustment signals receiving from different subscriber devices comprises a step of using non-overlapping or partially overlapping sub-sets of waveforms, wherein said sub-sets are distinct in the time domain and/or in the frequency domain or in the code domain.

8. A method according to claim 7, wherein said step of using non-overlapping or partially overlapping sub-sets of waveforms comprises assigning specific subsets by a network management entity, or by associating a sub-set with a unique base station identifier code.

9. A method according to claim 1, wherein said adjustment signal is transmitted in an OFDM scheme.

10. A method according to claim 9, wherein said OFDM scheme is derived by cyclically extending transmitted waveforms so that propagation differences between base stations are accounted for.

11. A method according to claim 10, wherein said cyclic extension is set equal to one or several OFDM symbol durations.

12. A method according to claim 1, wherein the step of receiving said adjustment signal at said second base station and retrieving adjustment information therefrom, comprises taking into account differences existing in propagation times between said first subscriber device and said first and second base stations, respectively.

13. A method according to claim 1, wherein said adjustment information comprises sets of contiguous or non-contiguous subcarriers occupying one or more OFDM symbols.

14. A method according to claim 13, wherein said subcarriers are modulated by pre-defined amplitude and/or phase sequence that belongs to a pre-defined set and wherein said modulation is carried out in the frequency domain, and/or in the time domain.

15. A method according to claim 14 wherein said pre-defined set is comprised of orthogonal or nearly orthogonal sequences.

16. A method according to claim 1, further comprising a step of selecting for which subscriber device a transmission opportunity (TO) is provided for transmitting said adjustment signal.

17. A method according to claim 16, wherein said step of selecting comprises one or more of the following options:
   a. at the base station, assigning a transmission opportunity for transmitting said adjustment signal, to those subscribers with low CINR, or to those subscribers to which previous DL transmissions had failed; or
   b. at the base station, assigning a transmission opportunity for transmitting said adjustment signal, to those subscribers to which a transmission opportunity were not assigned in the previous frames; or
   c. at the base station, assigning a transmission opportunity for transmitting said adjustment signal, to those subscriber devices which carry high volumes of traffic or traffic with high quality requirements; or
   d. at the base station, assigning transmission opportunities to all subscriber devices provided with DL allocations.

18. A method according to claim 1, further comprising a step of making, at said at least one second subscriber device, a decision whether to transmit an adjustment signal.

19. In a first wireless network comprising at least one first base station and at least one first subscriber device, wherein interferences are experienced in communications conducted between said at least one first subscriber device and said at least one first base station and wherein said interferences result from the operation of a second wireless network comprising at least one second base station and at least one second subscriber device, a method for reducing said interferences which comprises:
   transmitting from said at least first subscriber device an adjustment signal;
   receiving said adjustment signal at said second base station and retrieving therefrom adjustment information;
   based on the adjustment information thus retrieved, determining at said second base station whether a change in its transmissions should be effected, wherein carrying out said change would result in reducing the interferences experienced at said at least first subscriber device, and wherein said method further comprising a step of carrying out an adjustment in transmissions from said second base station, based on said information retrieved, and
   wherein in said step of carrying out an adjustment comprises effecting a change in the timing of transmissions being at a frequency which is substantially the same frequency as that in which said at least first subscriber device is operative, or effecting a change in the antenna beam directing, or effecting a change in direction of nulls in the beam pattern, or effecting a change in the power of at least the transmissions being at a frequency which is substantially the same frequency as that in which said at least first subscriber device is operative, or any combination thereof.

20. In a first wireless network comprising at least one first base station and at least one first subscriber device, wherein interferences are experienced in communications conducted between said at least one first subscriber device and said at least one first base station and wherein said interferences result from the operation of a second wireless network comprising at least one second base station and at least one second subscriber device, a method for reducing said interferences which comprises:
   transmitting from said at least first subscriber device an adjustment signal;
   receiving said adjustment signal at said second base station and retrieving therefrom adjustment information;
   based on the adjustment information thus retrieved, determining at said second base station whether a change in its transmissions should be effected, wherein carrying out said change would result in reducing the interferences experienced at said at least first subscriber device, and
   wherein in response to the information retrieved from said adjustment signal, said at least one second base station transmits to said at least one second subscriber device a signal indicating a change to be effected in transmissions from said at least one second subscriber device to said at least one second base station, wherein carrying out said change would result in reducing the interferences affecting communication between said at least one first base station and said at least one first subscriber device.

21. In a first wireless network comprising at least one first base station and at least one first subscriber device, wherein interferences are experienced in communications conducted between said at least one first subscriber device and said at least one first base station and wherein said interferences result from the operation of a second wireless network comprising at least one second base station and at least one second subscriber device, a method for reducing said interferences which comprises:
   transmitting from said at least first subscriber device an adjustment signal;
   receiving said adjustment signal at said second base station and retrieving therefrom adjustment information;
   based on the adjustment information thus retrieved, determining at said second base station whether a change in its transmissions should be effected, wherein carrying out said change would result in reducing the interferences experienced at said at least first subscriber device, and
   dividing DL sub-frames transmitted by said first and second base stations into essentially synchronized slots, where each DL transmission starts at a corresponding slot boundary, and where there is a one-to one correspondence between said slots and slots allocated for the transmission of said adjustment signals.

22. A method according to claim 21, wherein said division of the DL sub-frame into slots is performed in the time domain, and/or frequency domain and or code domain and/or in any other multiplexing scheme employed by the system.

23. A method according claim 21, wherein said division of the DL sub-frame into transmission slots is carried in accordance with the type of traffic carried and the payload distribution.

24. A method according to claim 21, further comprising controlling the size of the transmission slots.

25. A method according to claim 24, wherein said transmission slots are of unequal size.

26. In a first wireless network comprising at least one first base station and at least one first subscriber device, wherein interferences are experienced in communications conducted between said at least one first subscriber device and said at least one first base station and wherein said interferences result from the operation of a second wireless network comprising at least one second base station and at least one second subscriber device, a method for reducing said interferences which comprises:

transmitting from said at least first subscriber device an adjustment signal;

receiving said adjustment signal at said second base station and retrieving therefrom adjustment information;

based on the adjustment information thus retrieved, determining at said second base station whether a change in its transmissions should be effected, wherein carrying out said change would result in reducing the interferences experienced at said at least first subscriber device, wherein said method comprises a step of making, at said at least one second subscriber device, a decision whether to transmit an adjustment signal, and wherein said step of making a decision is based on estimating the interferences caused by that at least one second subscriber device to the communication held with said at least one first subscriber device.

27. A base station operative to operate in a wireless network and comprising:

an interface operative to allow communication between said base station and a communication network associated therewith;

at least one radio transceiver operative at least one frequency and capable of transmitting communication traffic towards at least one subscriber device and receive communication traffic therefrom, and further operative to receive an adjustment signal transmitted from at least one further subscriber device associated with a different wireless network;

at least one processor operative to:
  retrieve adjustment information from said adjustment signal received;
  determine whether to effect a change in transmissions from said base station and/or from any of said at least one subscriber device to enable reducing interference occurring in communications with said at least one further subscriber device, and if in the affirmative, determine the change that should be effected.

28. A base station according to claim 27, further comprising an advanced antenna system operative to effect a change in the antenna beam-directing, in response to the determination made by said at least one processor.

29. A base station according to claim 27, further comprising a power controller to effect a change in the power of at least the transmissions being at a frequency which is substantially the same frequency as that at which said at least one subscriber device is operative, in response to the determination made by said at least one processor.

30. A base station, operative to operate in a wireless network and comprising:

an interface operative to allow communication between said base station and a communication network associated therewith;

at least one radio transceiver operative at least one frequency and capable of transmitting communication traffic towards at least one subscriber device and receive communication traffic therefrom, and further operative to receive an adjustment signal transmitted from at least one further subscriber device associated with a different wireless network;

at least one processor adapted operative to:
  retrieve adjustment information from said adjustment signal received;
  determine whether to effect a change in transmissions from said base station and/or from any of said at least one subscriber device to enable reducing interference occurring in communications with said at least one further subscriber device, and
  if in the affirmative, determine the change that should be effected, and wherein said base station is further operative to transmit an indication signal to said at least one subscriber device in response to the information retrieved from said adjustment signal, wherein said indication signal indicates a change to be effected in transmissions from said at least one subscriber device in order to reduce interferences affecting communication between said at least one further subscriber device and a base station associated therewith.

31. A base station according to claim 27, wherein said at least one processor is further operative to determine whether a change in said base station transmissions should be effected, based on a load of traffic to be transmitted to said at least one subscriber device.

32. A subscriber device operative to operate in a wireless network and comprising:

an interface operative to allow communication between said subscriber device and at least one base station;

at least one radio transceiver operative at least one frequency and adapted to transmit communication traffic towards said at least one base station and receive communication traffic therefrom;

establish which of the channels carrying traffic to or from said subscriber terminal experience such interferences;

wherein said at least one radio transceiver is adapted to transmit a radio adjustment signal to be received by at least one further base station which signal characterizes the communication to and/or from said subscriber device that is subjected to interferences by communications carried between said at least one further base station and at least one further subscriber device associated therewith.

33. A subscriber terminal according to claim 32, wherein said at least one processor is further operative to incorporate at least one marking signal indicating a frame beginning or a frame end or both.

34. A subscriber device according to claim 32, wherein said at least one processor is further operative to determine existence of interferences caused by radio transmissions at a substantially the same or substantially adjacent frequency occurring during transmissions to or reception from said at least one base station.

* * * * *